No. 725,605. PATENTED APR. 14, 1903.
N. TESLA.
SYSTEM OF SIGNALING.
APPLICATION FILED JULY 16, 1900.
NO MODEL.
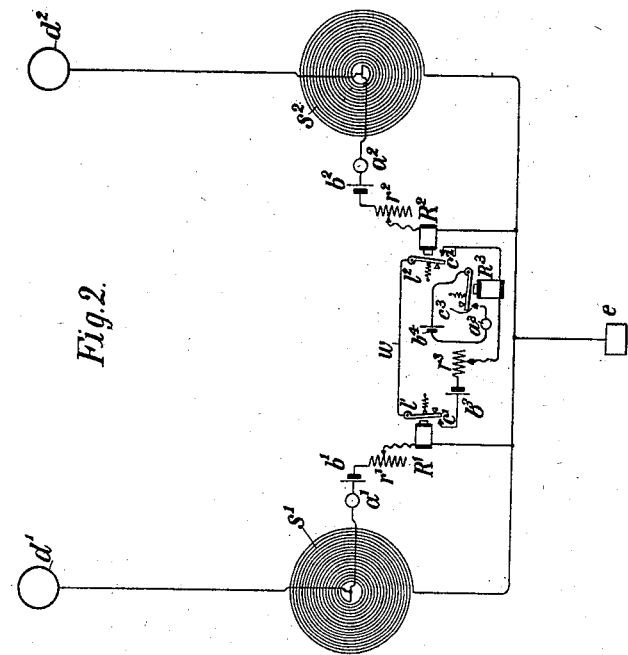
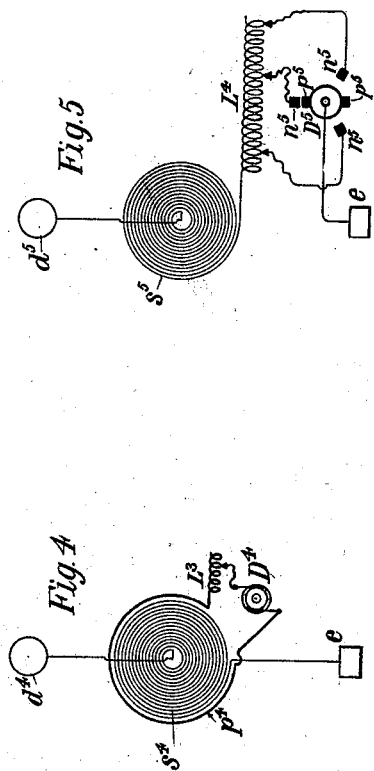
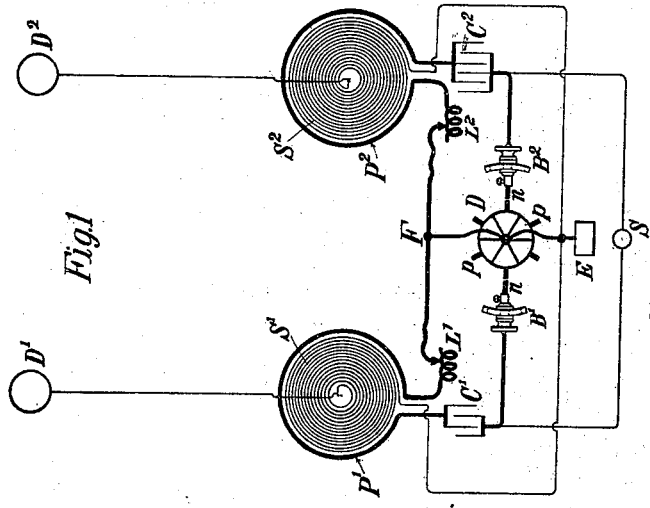
Witnesses:
Raphael Netter
C. D. Morrill
Nikola Tesla, Inventor
by 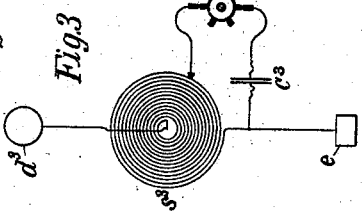
Attys

UNITED STATES PATENT OFFICE.

NIKOLA TESLA, OF NEW YORK, N. Y.

SYSTEM OF SIGNALING.

SPECIFICATION forming part of Letters Patent No. 725,605, dated April 14, 1903.

Application filed July 16, 1900. Serial No. 23,847. (No model.)

*To all whom it may concern:*

Be it known that I, NIKOLA TESLA, a citizen of the United States, residing in the borough of Manhattan, in the city, county, and State of New York, have invented certain new and useful Improvements in Systems of Signaling, of which the following is a specification, reference being had to the drawings accompanying and forming a part of the same.

In certain systems for transmitting intelligible messages or governing the movements and operations of distant automata electrical impulses or disturbances produced by suitable apparatus are conveyed through the natural media to a distant receiving-circuit capable of responding to the impulses, and thereby effecting the control of other appliances. Generally a special device highly sensitive is connected to the receiving-circuit, which in order to render it still more susceptible and to reduce the liability of its being affected by extraneous disturbances is carefully adjusted so as to be in tune with the transmitter. By a scientific design of the sending and receiving circuits and other apparatus and skilful adjustment of the same these objects may be in a measure attained; but in long experience I have found that notwithstanding all constructive advantages and experimental resources this method is in many cases inadequate. Thus while I have succeeded in so operating selectively under certain favorable conditions more than one hundred receivers in most cases it is practicable to work successfully but a few, the number rapidly diminishing as, either owing to great distance or other causes, the energy available in the tuned circuits becomes smaller and the receivers necessarily more delicate. Evidently a circuit however well constructed and adjusted to respond exclusively to vibrations of one period is apt to be affected by higher harmonics and still more so by lower ones. When the oscillations are of a very high frequency, the number of the effective harmonics may be large, and the receiver consequently easily disturbed by extraneous influences to such an extent that when very short waves, such as those produced by Hertzian spark apparatus, are used little advantage in this respect is derived from tuning the circuits. It being an imperative requirement in most practical applications of such systems of signaling or intelligence transmission that the signals or messages should be exclusive or private, it is highly desirable to do away with the above limitations, especially in view of the fact, which I have observed, that the influence of powerful electrical disturbances upon sensitive receivers extends, even on land, to distances of many hundreds of miles, and consequently in accordance with theory still farther on sea. To overcome these drawbacks and to enable a great number of transmitting and receiving stations to be operated selectively and exclusively and without any danger of the signals or messages being disturbed, intercepted, or interfered with in any way is the object of my present invention.

Broadly stated, this invention consists in the combination of means for generating and transmitting two or more kinds or classes of disturbances or impulses of distinctive character with respect to their effect upon a receiving-circuit and a distant receiver which comprises two or more circuits of different electrical character or severally tuned, so as to be responsive to the different kinds or classes of impulses and which is dependent for operation upon the conjoint or resultant action of the two or more circuits or the several instrumentalities controlled or operated thereby. By employing only two kinds of disturbances or series of impulses instead of one, as has heretofore been done, to operate a receiver of this kind, I have found that safety against the disturbing influences of other sources is increased to such an extent that I believe this number to be amply sufficient in most cases for rendering the exchange of signals or messages reliable and exclusive; but in exceptional instances a greater number may be used and a degree of safety against mutual and extraneous interference attained, such as is comparable to that afforded by a combination-lock. The liability of a receiver being affected by disturbances emanating from other sources, as well as that of the signals or messages being received by instruments for which they are not intended, may, however, be reduced not only by an increased number of the coöperative disturbances or series of impulses, but also by a judicious choice of the same and the order in which they are made to act upon the receiver.

Evidently there are a great many ways of generating impulses or disturbances of any wave length, wave form, number or order of succession, or of any special character such as will be capable of fulfilling the requirements above stated, and there are also many ways in which such impulses or disturbances may be made to coöperate and to cause the receiver to be actuated, and inasmuch as the skill and practical knowledge in these novel fields can only be acquired by long experience the degree of safety and perfection attained will necessarily depend upon the ability and resource of the expert who applies my invention; but in order to enable the same to be successfully practiced by any person possessed only of the more general knowledge and experience in these branches I shall describe the simplest plan of carrying it out which is at present known to me.

For a better understanding of the subject reference is now made to the accompanying drawings, in which—

Figures 1 and 2 represent diagrammatically the apparatus and circuit connections employed at the sending and receiving stations, respectively; and Figs. 3, 4, and 5 modified means which may be employed in the practical application of the invention.

In Fig. 1, $S'$ and $S^2$ are two spirally-wound coils or conductors connected with their inner ends to elevated terminals $D'$ and $D^2$, respectively, and with their outer ends to an earth-plate E. These two coils, conductors, or systems $D' S' E$ and $D^2 S^2 E$ have different and suitably-chosen periods of vibration, and, as pointed out in other patents relating to my system of energy and intelligence transmission, their lengths should be such that the points of maximum pressure developed therein coincide with the elevated terminals $D' D^2$. The two systems may have electrical oscillations impressed upon them in any desired manner, conveniently by energizing them through primaries $P'$ and $P^2$, placed in proximity to them. Adjustable inductances $L'$ and $L^2$ are preferably included in the primary circuits chiefly for the purpose of regulating the rates of the primary oscillations. In the drawings these primaries $P'$ and $P^2$ surround the coils $S' S^2$ and are joined in series through the inductances $L' L^2$, conductor F, condensers $C'$ and $C^2$, brush-holders $B'$ and $B^2$, and a toothed disk D, which is connected to the conductor F and, if desired, also to the ground-plate E, as shown, two independent primary circuits being thus formed. The condensers $C'$ and $C^2$ are of such capacity and the inductances $L'$ and $L^2$ are so adjusted that each primary is in close resonance with its secondary system, as I have explained in other patents granted to me. The brush-holders $B'$ and $B^2$ are capable independently of angular and, if necessary, also of lateral adjustment, so that any desired order of succession or any difference of time interval between the discharges occurring in the two primary circuits may be obtained. The condensers being energized from a suitable source S, preferably of high potential, and the disk D being rotated, its projections or teeth $p\ p$, coming at periodically-recurring intervals in very close proximity to or, as the case may be, in contact with conducting rods or brushes $n\ n$, cause the condensers to be discharged in rapid succession through their respective circuits. In this matter the two secondary systems $D' S' E$ and $D^2 S^2 E$ are set in vibration and oscillate freely, each at its proper rate, for a certain period of time at every discharge. The two vibrations are impressed upon the ground through the plate E and spread to a distance reaching the receiving-station, which has two similar circuits or systems $e\ s'\ d'$ and $e\ s^2\ d^2$ arranged and connected in the same manner and tuned to the systems at the sending-station, so that each responds exclusively to one of the two vibrations produced by the transmitting apparatus. The same rules of adjustment are observed with respect to the receiving-circuits, care being, furthermore, taken that the tuning is effected when all the apparatus is connected to the circuits and placed in position, as any change may more or less modify the vibration. Each of the receiving-coils $s'$ and $s^2$ is shunted by a local circuit containing, respectively, sensitive devices $a'\ a^2$, batteries $b'\ b^2$, adjustable resistances $r'\ r^2$, and sensitive relays $R'\ R^2$, all joined in series, as shown. The precise connections and arrangements of the various receiving instruments are largely immaterial and may be varied in many ways. The sensitive devices $a'\ a^2$ may be any of the well-known devices of this kind—as, for example, two conducting-terminals separated by a minute air-gap or a thin film of dielectric which is strained or weakened by a battery or other means to the point of breaking down and gives way to the slightest disturbing influence. Its return to the normal sensitive state may be secured by momentarily interrupting the battery-circuit after each operation or otherwise. The relays $R'\ R^2$ have armatures $l'\ l^2$, which are connected by a wire $w$ and when attracted establish electrical contacts at $c'$ and $c^2$, thus closing a circuit containing a battery $b^3$, an adjustable resistance $r^3$, and a relay $R^3$.

From the above description it will be readily seen that the relay $R^3$ will be operated only when both contacts $c'$ and $c^2$ are closed.

The apparatus at the sending-station may be controlled in any suitable manner—as, for instance, by momentarily closing the circuit of the source S, two different electric vibrations being emitted simultaneously or in rapid succession, as may be desired, at each closure of the circuit. The two receiving-circuits at the distant station, each tuned to respond to the vibrations produced by one of the elements of the transmitter, affect the sensitive devices $a'$ and $a^2$ and cause the relays $R'$ and $R^2$ to be operated and contacts $c'$ and $c^2$ to be closed, thus actuating the receiver or relay $R^3$, which in turn establishes a contact $c^3$ and brings into action a device $a^3$ by means of a battery $d^4$, included in a local circuit, as shown; but evidently if through any extraneous disturbance only one of the circuits at the receiving-station is affected the relay $R^3$ will fail to respond. In this way communication may be carried on with greatly-increased safety against interference and privacy of the messages may be secured. The receiving-station (shown in Fig. 2) is supposed to be one requiring no return message; but if the use of the system is such that this is necessary then the two stations will be similarly equipped and any well-known means, which it is not thought necessary to illustrate here, may be resorted to for enabling the apparatus at each station to be used in turn as transmitter and receiver. In like manner the operation of a receiver, as $R^3$, may be made dependent, instead of upon two, upon more than two such transmitting systems or circuits, and thus any desired degree of exclusiveness or privacy and safety against extraneous disturbances may be attained. The apparatus as illustrated in Figs. 1 and 2 permits, however, special results to be secured by the adjustment of the order of succession of the discharge of the primary circuits $P'$ and $P^2$ or of the time interval between such discharges. To illustrate, the action of the relays $R'$ $R^2$ may be regulated either by adjusting the weights of the levers $l'$ $l^2$, or the strength of the batteries $b'$ $b^2$, or the resistances $r'$ $r^2$, or in other well-known ways, so that when a certain order of succession or time interval between the discharges of the primary circuits $P'$ and $P^2$ exists at the sending-station the levers $l'$ and $l^2$ will close the contacts $c'$ and $c^2$ at the same instant, and thus operate the relay $R^3$; but it will fail to produce this result when the order of succession of or the time interval between the discharges in the primary circuits is another one. By these or similar means additional safety against disturbances from other sources may be attained and, on the other hand, the possibility afforded of effecting the operation of signaling by varying the order of succession of the discharges of the two circuits. Instead of closing and opening the circuit of the source S, as before indicated, for the purpose of sending distinct signals it may be convenient to merely alter the period of either of the transmitting-circuits arbitrarily, as by varying the inductance of the primaries.

Obviously there is no necessity for using transmitters with two or more distinct elements or circuits, as $S'$ and $S^2$, since a succession of waves or impulses of different characteristics may be produced by an instrument having but one such circuit. A few of the many ways which will readily suggest themselves to the expert who applies my invention are illustrated in Figs. 3, 4, and 5. In Fig. 3 a transmitting system $e\,s^3\,d^3$ is partly shunted by a rotating wheel or disk $D^3$, which may be similar to that illustrated in Fig. 1 and which cuts out periodically a portion of the coil or conductor $s^3$ or, if desired, bridges it by an adjustable condenser $C^3$, thus altering the vibration of the system $e\,s^3\,d^3$ at suitable intervals and causing two distinct kinds or classes of impulses to be emitted in rapid succession by the sender. In Fig. 4 a similar result is produced in the system $e\,s^4\,d^4$ by periodically short-circuiting, through an induction-coil $L^3$ and a rotating disk $D^4$ with insulating and conducting segments, a circuit $p^4$ in inductive relation to said system. Again, in Fig. 5 three distinct vibrations are caused to be emitted by a system $e\,s^5\,d^5$, this result being produced by inserting periodically a suitable number of turns of an induction-coil $L^4$ in series with the oscillating system by means of a rotating disk $B^5$ with two projections $p^5$ $p^5$ and three rods or brushes $n^5$, placed at an angle of one hundred and twenty degrees relatively to each other. The three transmitting systems or circuits thus produced may be energized in the same manner as those of Fig. 1 or in any other convenient way. Corresponding to each of these cases the receiving-station may be provided with two or three circuits in an analogous manner to that illustrated in Fig. 2, it being understood, of course, that the different vibrations or disturbances emitted by the sender follow in such rapid succession upon each other that they are practically simultaneous, so far as the operation of such relays as $R'$ and $R^2$ is concerned. Evidently, however, it is not necessary to employ two or more receiving-circuits; but a single circuit may be used also at the receiving-station constructed and arranged like the transmitting circuits or systems illustrated in Figs. 3, 4, and 5, in which case the corresponding disks, as $D^3$ $D^4$ $D^5$, at the sending will be driven in synchronism with those at the receiving stations as far as may be necessary to secure the desired result; but whatever the nature of the specific devices employed it will be seen that the fundamental idea in my invention is the operation of a receiver by the conjoint or resultant effect of two or more circuits each tuned to respond exclusively to waves, impulses, or vibrations of a certain kind or class produced either simultaneously or successively by a suitable transmitter.

It will be seen from a consideration of the nature of the method hereinbefore described that the invention is applicable not only in the special manner described, in which the transmission of the impulses is effected through natural media, but for the transmission of energy for any purpose and whatever the medium through which the impulses are conveyed.

What I claim is—

1. In a system for the transmission of electrical energy, the combination with means for producing two or more distinctive kinds of disturbances or impulses, of receiving-circuits, each tuned to respond to the waves or impulses of one kind only, and a receiving device dependent for operation upon the conjoint action of the several receiving-circuits, as set forth.

2. In a system for the transmission of electrical impulses and the operation or control, of signaling or other apparatus thereby, the combination with a transmitter adapted to produce two or more distinctive kinds or classes of disturbances or impulses, of sensitive receiving-circuits, each tuned to respond to the impulses or disturbances of one kind or class only, and a receiving device dependent for operation upon the conjoint action of the sensitive circuits, as set forth.

3. In a system for the transmission of electrical impulses, and the operation or control of signaling, or other apparatus thereby, the combination with a transmitter adapted to produce two or more distinctive kinds or classes of disturbances or impulses, of sensitive circuits at the receiving point or station, each tuned to respond to the impulses or disturbances of one kind or class only, a local circuit arranged to be completed by the conjoint action of the sensitive circuits and a receiving device connected therewith, as set forth.

4. In a system for the transmission of electrical impulses, and the operation or control of signaling or other apparatus thereby, the combination with a transmitting apparatus adapted to produce two or more distinctive kinds of disturbances or impulses, of means for varying the time intervals of the emission of the impulses of the several kinds, sensitive circuits each tuned to respond to the impulses or disturbances of one kind only, and a receiving apparatus dependent for operation upon the conjoint action of the sensitive circuits, as set forth.

5. In a system, such as herein described, the combination with a transmitter adapted to produce a plurality of distinctive kinds of electrical disturbances or impulses, of a receiving apparatus comprising a plurality of circuits, a sensitive device and a relay included in each circuit, and each said circuit being tuned to respond to the impulses or disturbances of one kind only, and a receiving apparatus in a local circuit controlled by the relays and adapted to be completed by the conjoint action of all of said relays, as set forth.

6. In a system of the kind described, the combination with a transmitter adapted to produce two or more series of electrical oscillations or impulses of different frequencies, of a receiving apparatus comprising a plurality of sensitive circuits each tuned to respond to the impulses of one of the series produced by the transmitter, and a signaling device dependent for its operation upon the conjoint action of said circuits, as set forth.

7. The combination with a plurality of transmitter elements, each adapted to produce a series of impulses or disturbances of a distinctive character, and means for controlling and adjusting the same, of a receiver having a plurality of sensitive circuits each tuned so as to be affected by one of the series of impulses only, and dependent for operation upon the conjoint action of all of said circuits, as set forth.

8. The combination with a transmitter adapted to produce series of electrical impulses or disturbances of distinctive character and in a given order of succession, of a receiving apparatus comprising tuned circuits responding to such impulses in a corresponding order, and dependent for operation upon the conjoint action of said elements, as set forth.

9. In a receiving apparatus, the combination with a plurality of sensitive circuits, severally turned to respond to waves or impulses of a different kind or class, a receiving-circuit controlled by the sensitive circuits and a device connected with the receiving-circuits adapted to be operated when said circuit is completed by the conjoint action of two or more of the sensitive circuits, as set forth.

10. A system for the transmission of electrical energy, having in combination means for producing and transmitting two or more impulses of different periodicities to form a signal in a predetermined order of succession, as set forth.

11. In a system for the transmission of electrical energy, the combination with a transmitting apparatus comprising one or more circuits, means for impressing therein oscillations or impulses of different character and a receiving apparatus comprising a plurality of circuits each tuned to respond to the impulses of one kind produced by the transmitter and a receiver dependent for operation upon the conjoint action of the receiving-circuits, as set forth.

12. In a system for the transmission of electrical energy, the combination with a transmitting apparatus comprising a transformer and means for impressing upon the secondary element of the same oscillations or impulses of different character, of a receiving apparatus comprising a plurality of circuits each tuned to the impulses of one kind emitted by the secondary of the transmitting-transformer, and a receiver dependent for operation upon the conjoint action of the receiving-circuits, as set forth.

13. In a system for the transmission of electrical energy, the combination with a transmitting apparatus comprising a transformer and means for impressing upon the secondary elements of the same oscillations or impulses of different periodicities and in a given order of succession, of a receiving apparatus comprising a plurality of circuits each tuned to respond to the transmitted impulses of one period, and a receiver dependent for operation upon the conjoint action of the receiving-circuits, as set forth.

14. In a signaling system, the combination of means for generating a series of electrical impulses of different periodicities, receiving-circuits of differing electrical periods of vibration, and an indicating mechanism operated to give an intelligible indication only when currents are induced in the receiving-circuits in a predetermined order, as set forth.

15. In a system for the transmission of energy, the combination of two or more circuits differing with respect of one of their electrical constants, means for energizing said circuits, and an indicating mechanism operative only by conjoint action of two or more currents generated by waves from the sending-station, as set forth.

16. In a system for the transmission of electrical energy, the combination with a transmitter adapted to produce electrical waves or oscillations varying in character in a predetermined order, of a receiving instrument responsive to said oscillations and dependent for operation upon the action thereof in a corresponding order, as set forth.

NIKOLA TESLA.

Witnesses:
JOHN C. KERR,
RICHARD S. DONOVAN.